United States Patent Office 2,805,219
Patented Sept. 3, 1957

2,805,219

RESOLUTION OF RACEMIC α-HYDROXY-β,β-DIMETHYL-γ-BUTYROLACTONE

Fred Kagan and John W. Greiner, Kalamazoo Township, Kalamazoo County, and David I. Weisblat, Galesburg, Mich., assignors to The Upjohn Company, Kalamazoo, Mich., a corporation of Michigan No Drawing. Application September 9, 1954,
Serial No. 455,078

15 Claims. (Cl. 260—211)

The present invention relates to the resolution of racemic α-hydroxy-β,β-dimethyl-γ-butyrolactone, and is more particularly concerned with the resolution of the racemic mixture by the use of D(−)galactamine, with the recovery of D(−)α-hydroxy-β,β-dimethyl-γ-butyrolactone and L(+)α-hydroxy-β,β-dimethyl-γ-butyrolactone, and with the novel compounds (−)-N-D-dulcityl-L-(α,γ-dihydroxy-β,β-dimethylbutyramide) and (+)-N-D-dulcityl-D(α,γ-dihydroxy-β,β-dimethylbutyramide), and the preparation thereof.

For the sake of convenience the racemic α-hydroxy-β,β-dimethyl-γ-butyrolactone will be hereinafter referred to in the specification as D,L-pantolactone; D(−)α-hydroxy-β,β-dimethyl-γ-butyrolactone and L(+)α-hydroxy-β,β-dimethyl-γ-butyrolactone will be referred to as (−)pantolactone and (+)pantolactone, respectively; (−)-N - D - dulcityl - L - (α,γ - dihydroxy - β,β - dimethylbutyramide and (+) - N - D-dulcityl-D-(α,γ-dihydroxy-β,β-dimethylbutyramide) will be referred to as (−)dulcitylpantamide and (+)dulcitylpantamide, respectively.

(−)Pantolactone is important in the synthesis of the physiologically active (+)pantothenic acid or salts thereof which can be prepared by treating the above isomer with β-alanine or salts thereof. (−)Pantothenic acid is therapeutically inactive so it becomes highly desirable to separate D,L-pantolactone into the (+) and (−) components prior to the reaction with β-alanine or its salts.

In the process of the present invention the racemic pantolactone [Stiller et al.: J. Am. Chem. Soc. 62, 1785 (1940)] is treated with D(−)galactamine to produce the novel diastereoisomers (−) and (+)dulcitylpantamides represented by the following formula:

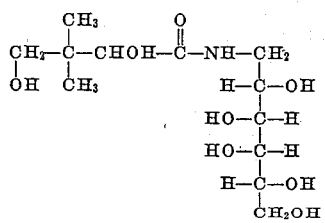

The novel diastereoisomers are separated by procedures known in the art, e. g., fractional crystallization, countercurrent extraction, or chromatography, and the separated diastereoisomers (−) and (+)dulcitylpantamide are hydrolyzed to produce (+) and (−)pantolactone, respectively. The present process is equally applicable to any ratio of (+) and (−)pantolactone and is not necessarily restricted to racemic mixtures.

The novel (−)dulcitylpantamide is also useful in the preparation of (−)pantolactone. The (−)dulcitylpantamide is first hydrolyzed and the resulting (+)pantolactone is racemized by heating with alcoholic sodium hydroxide according to the technique outlined by Stiller et al., supra, to produce an additional quantity of the D,L-pantolactone which can thereupon be resolved according to the process of the present invention to produce an additional quantity of (−)pantolactone.

Thus it is an object of the present invention to provide a novel process for the resolution of D,L-pantolactone. It is a further object of the present invention to produce the novel (+)dulcitylpantamide and (−)dulcitylpantamide which are useful intermediates in the preparation of the active (−)pantolactone. Other objects of the present invention are apparent to those skilled in the art to which the invention pertains.

D(−)galactamine can be prepared by the process disclosed by Roux, in Annales de Chimie et de Physique, vol. [8], 1, 142 (1904).

The process of the present invention is advantageously carried out by heating D(−)galactamine with D,L-pantolactone in the presence of an inert organic solvent such as methanol, ethanol, isopropanol, ethylene glycol, propylene glycol, 2-methoxy-ethanol (methyl Cellosolve), 2-ethoxyethanol (Cellosolve), diethylene glycol monoethyl ether (Carbitol), and the like, with ethanol being preferred. Stoichiometric quantities of D(−)galactamine and D,L-pantolactone can be employed but it is generally advantageous to utilize an excess of D,L-pantolactone. Excess pantolactone can be recovered at any stage of the reaction, if so desired, by dissolving the reaction product in water and extracting with an organic solvent such as a chlorinated hydrocarbon, e. g., methylene chloride, ethylene dichloride, chloroform, and the like, or an aliphatic ether such as diethyl ether, diisopropyl ether, dibutyl ether, and the like.

The condensation of D(−)galactamine with D,L-pantolactone is generally conducted at the boiling point of the solvent employed, although other temperatures between about fifty and about 225 degrees centigrade, advantageously between about seventy and about 100 degrees centigrade, can also be used. The reaction is advantageously completed in a period of between about two and about twenty hours, the longer reaction period being usually required at the lower reaction temperature.

The reaction mixture thereupon can be worked up, i. e., the diastereoisomeric (−) and (+)dulcitylpantamides are separated from each other by countercurrent extraction, chromatographic, and/or crystallization procedures. Ordinarily, however, simple fractional crystallization will suffice. Suitably the reaction mixture is filtered to remove any crystals already present and the filtrate is then treated, as by cooling and/or concentrating, to yield an additional crop or crops of crystals. The respective crops can then be further purified by recrystallization from a suitable solvent such as absolute ethanol, isopropanol, methyl Cellosolve, Carbitol, and the like, with absolute ethanol being the preferred solvent.

The resolution can also be accomplished by fusing the starting reactants without a solvent, at a temperature between about 100 degrees and about 200 degrees centigrade, with about 125 to about 150 degrees centigrade being preferred. The reaction is normally completed in a period of between about one and about four hours, the longer reaction time being required at the lower temperatures. The brown syrupy reaction product is dissolved in water and any excess pantolactone is recovered by extraction with an organic solvent as disclosed in the above solvent addition process. The water is removed by vacuum distillation and the residual syrup is taken up with a small amount of an inert solvent, such as ethanol, isopropanol, methyl Cellosolve, Carbitol, and the like, with ethanol being preferred. The separation of the diastereoisomers is then effected as described in the above solvent addition process.

The recovered (−) and (+) dulcitylpantamides can be readily hydrolyzed by conventional techniques such as acid hydrolysis, with hydrochloric acid, sulfuric acid, p-toluenesulfonic acid, and the like. The diastereoisomeric (—) and (+) dulcitylpantamides on hydrolysis yield (+) and (—) pantolactone, respectively, along with D(—) galactamine. The hydrolysis can be conducted at a temperature of between about 25 degrees centigrade and about 125 degrees centigrade, preferably at a temperature of between about fifty and about 100 degrees centigrade, and from the hydrolysate the pantolactone can be recovered by extracting with a chlorinated hydrocarbon such as methylene chloride, ethylene dichloride, chloroform, and the like. D(—) galactamine salt is present in the aqueous phase and can be recovered by conventional techniques. The recovered D(—) galactamine can be reused as a resolving agent.

The following examples are illustrative of the process and products of the present invention, but are not to be construed as limiting.

*Example 1.—Preparation of pure (+) dulcitylpantamide*

D(—) galactamine (0.585 grams, 0.00323 mole) and 0.763 gram (0.00587 mole; 81 mole percent excess) of (—) pantolactone (Stiller et al. supra) were fused in a test tube on a steam bath for four hours. The hard glass which formed on cooling was broken up and slurried with about four milliliters of absolute ethanol and then all but about ten milligrams was brought into solution in twelve milliliters of hot ethanol. On standing overnight, a copious white precipitate formed. This was removed by filtration, washed with ethanol by decantation, and dried to yield 0.682 gram (68 percent based on D(—) galactamine) of product having a melting point of 115 to 116 degrees centigrade. Recrystallization from hot absolute ethanol yielded 0.56 gram of (+) dulcitylpantamide melting at 117 to 118 degrees centigrade, having a specific rotation at 25 degrees centigrade of +11 degrees (C 4%, water), and having the following analysis:

Analysis.—Calc. for $C_{12}H_{25}O_8N$: C, 46.29; H, 8.09; N, 4.50. Found: C, 46.38; H, 8.12; N, 4.66.

*Example 2.—Preparation of pure (—) dulcitylpantamide*

In a three-necked, round-bottomed flask equipped with a mechanical stirrer and a condenser protected from moisture by a calcium chloride tube was placed 1.412 grams (0.0078 mole) of D(—) galactamine, 1.35 grams (0.0104 mole; 33 mole percent excess) of (+) pantolactone (Stiller et al. supra) and 75 milliliters of absolute ethanol. The reaction mixture was heated with stirring to the reflux temperature for twelve hours. The resulting cloudy yellow solution was clarified by centrifugation and was stored overnight at room temperature. The crude (—) dulcitylpantamide which separated was removed by centrifugation, weighed 0.74 gram, and had a specific rotation in water of —20 degrees. The mother liquor was concentrated to about 35 milliliters and after being stored for one week at room temperature 0.942 gram (39 percent based on D(—) galactamine) of (—) dulcitylpantamide was removed. This compound melted at 122 to 123 degrees centigrade and had a specific rotation in water at 25 degrees centigrade of —33 degrees.

Analysis.—Calc. for $C_{12}H_{25}O_8N$: C, 46.29; H, 8.09; N, 4.50. Found: C, 46.63; H, 8.10; N, 4.24.

*Example 3.—Resolution of D,L-pantolactone*

In a 500-milliliter three-necked, round-bottomed flask was placed 17.4 grams (0.134 mole) of D,L-pantolactone, 11.2 grams (.062 mole) of D(—) galactamine, and 200 milliliters of absolute ethanol, and the reaction mixture was heated to reflux with vigorous stirring in a nitrogen atmosphere for seven hours. The cloudy mixture was filtered by gravity to give a clear pale yellow filtrate (pH 8). The alcohol was removed under reduced pressure and the residual syrup was taken up in forty milliliters of hot water and excess pantolactone was removed by extraction with five forty-milliliter portions of methylene chloride. The combined methylene chloride extracts were dried over anhydrous sodium sulfate and concentrated to a semi-solid. The aqueous solution was concentrated under reduced pressure to yield a viscous pale yellow syrup which was dried by distillation of three fifty-milliliter portions of absolute ethanol. The dry residual syrup was taken up in 65 milliliters of absolute ethanol, and the solution was seeded with (—) dulcitylpantamide having a melting point of about 122–123 degrees centigrade, and stored at three degrees centigrade. Five crops of crystals were removed over a period of two weeks (see Table 1 below). After Crop E was removed, the mother liquor was concentrated to a syrup which by infrared examination proved to consist essentially of dulcitylpantamide. The residue (7.2 grams, 37.5 percent) was dissolved in 25 milliliters of water and the resulting solution was extracted with methylene chloride. The aqueous phase was evacuated to remove residual methylene chloride and then was passed through a column of activated charcoal and diatomaceous earth (1:2 by weight). The golden yellow color of the feed was removed by this treatment. The effluent solution was concentrated under reduced pressure to a viscous syrup which was taken up in eighteen milliliters of hot absolute ethanol. The solution was seeded with (+) dulcitylpantamide and stored at three degrees centigrade for two days to produce 2.04 grams (10.6 percent), of a high melting polymorph of (—) dulcitylpantamide, having a melting point of 149–152 degrees centigrade, and a specific rotation in water at 25 degrees centigrade of —25 degrees (Crop F). This high melting polymorph after three recrystallizations from ethanol-water, melted at 162–165 degrees centigrade, had a specific rotation in water at 25 degrees centigrade of —33 degrees, and gave the following analysis:

Analysis.—Calc. for $C_{12}H_{25}O_8N$: C, 46.29; H, 8.09; N, 4.50. Found: C, 46.20; H, 8.60; N, 4.37.

The results of Example 3 are summarized in the following table:

TABLE 1.—THE RESOLUTION OF D,L-PANTOLACTONE WITH D(—) GALACTAMINE

[Theoretical amides=19 grams.]

| Crop | A | B | C | D | E | F |
|---|---|---|---|---|---|---|
| Wt. (grams) | 6.65 | 1.43 | 2.05 | 0.5 | 1.0 | 2.04 |
| Recovered Wt. percent of Theory of Dulcitylpantamide | 34.5 | 7.4 | 10.6 | 2.6 | 5.4 | 10.6 |
| M. P. (° C.) | 107.5–112 | 100–106 | 111–117 | 115–122 | 92–102 | 149–152 |
| $[\alpha]_D^{25}H_2O$ (°) | —2 | —20 | —28 | —29 | 0 | —25 |
| Percent of D(+) Component | 71 | 30 | 12 | 10 | 75 | 19 |
| Percent of L(—) Component | 29 | 70 | 88 | 90 | 25 | 81 |
| Recovered Wt. Percent of D(+) isomer | 49 | 4.44 | 2.64 | .52 | 8.1 | 4.03 |
| Cum. Wt. Percent of D(+) isomer | 49 | 53.4 | 56 | 56.5 | 64.5 | 68.5 |
| Recovered Wt. Percent of L(—) isomer | 20 | 10.3 | 18.6 | 4.67 | 2.70 | 18.2 |
| Cum. Wt. Percent of L(—) isomer | 20 | 30.3 | 48.9 | 53.5 | 56.2 | 74.4 |

The percentage of the (+) or (—) dulcitylpantamide components is determined by the following equation:

$$\text{Percent of } (+) \text{ component} = \frac{[\alpha]_m - (-33)}{(-33) - (+11)}$$

Percent of (−) component=100−percent of (+) component wherein [α]m, −33, and +11 have the following significance:

[α]m=Specific rotation in 1–5 percent water solution of the particular Crop in question.

+11=Specific rotation of the pure (+) dulcitylpantamide.

−33=Specific rotation of the pure (−) dulcitylpantamide.

The recovered weight percent of the pure (+) or (−)dulcitylpantamide is determined by multiplying the percent of (+) or (−) component in each crop by the recovered weight percent of theory of dulcitylpantamide in each crop and multiplying this result by two. The result is multiplied by two since the total quantity of calculated theoretical amides is assumed to be 50 percent (+) and 50 percent (−)dulcitylpantamide and doubling the obtained result places the recovered weight percent on a 100 percent basis.

The commercial attractiveness of the process of the present invention was greatly enhanced by the discovery of the above-mentioned high melting polymorph of (−) dulcitylpantamide (melting point=162–165 degrees centigrade; $[\alpha]_D^{25}$ in water=−33 degrees). Prior to this unexpected discovery, fractional crystallization resulted in a relatively small yield of the desirable (+)dulcitylpantamide, e. g., see Example 3 and Table 1. In the early attempts to employ fractional crystallization (+)-dulcitylpantamide crystallized first from the reaction mixture but in relatively small yields and in admixture with relatively large amounts of the (−)dulcitylpantamide. See Crop A in Table 1. When the concentration of the (+)dulcitylpantamide became less than that of the low-melting polymorph of (−)dulcitylpantamide (melting point=122–123 degrees centigrade; $[\alpha]_D^{25}$ in water=−33 degrees) which generally occurred after about 10–20 percent of the (+)dulcitylpantamide had come out of the solution, the (−)isomer also began to crystallize. This behavior, therefore, resulted in a contaminated product. The recovery of Crop F in Example 3 resulted in the unexpected discovery of the high-melting polymorph of (−)dulcitylpantamide which in a purified state has an optical rotation which is identical with that possessed by the low-melting polymorph of (−)dulcitylpantamide and has a solubility substantially less than that of the (+)isomer. Subsequent runs thereupon resulted in the removal of the major portion of the aforesaid high-melting polymorph of (−)dulcitylpantamide in the first crop, and removal of the major portion of the (+)dulcitylpantamide in the second crop. (Note Example 4 and Table 2). The relatively low solubility of the new high-melting polymorph of (−)dulcitylpantamide compared with that of the (+)dulcitylpantamide and the low-melting polymorph of (−)dulcitylpantamide is ideally suited for the early removal of the (−)dulcitylpantamide and results in improved yields and less contamination of the (+)dulcitylpantamide in subsequent crops.

*Example 4.—Resolution of D,L-pantolactone*

In a 1-liter three-necked flask equipped with a mechanical stirrer and a condenser topped with a nitrogen source, was placed 100 grams (0.77 mole, 100 percent excess) of D,L-pantolactone and 500 milliliters of absolute ethanol. About 100 milliliters of the ethanol was removed by distillation to dry the system. The solution was cooled below the boiling point and D(−)galactamine (70 grams, 0.387 mole) was added, and the suspension was stirred vigorously at the reflux temperature in a nitrogen atmosphere for 17.5 hours. The reaction mixture (pH 7) was cooled to about 23 degrees centigrade, and 47.2 grams (39 percent of theoretical) (Crop A in Table 2 outlined below) of dulcitylpantamide with a melting point of 161.5–163.5 degrees centigrade and a specific rotation in water at 25 degrees centigrade of −30 degrees was obtained, indicating a dulcitylpantamide containing 93 percent of (−)dulcitylpantamide and seven percent of (+)dulcitylpantamide.

The filtrate was concentrated to a syrup under reduced pressure. This was taken up in 200 milliliters of warm water. The aqueous solution was extracted six times with 125-milliliter portions of methylene chloride. The combined methylene chloride extracts were dried over anhydrous sodium sulfate and concentrated to a semi-solid consisting of 50 grams (100 percent) of recovered excess pantolactone. The aqueous phase was concentrated under reduced pressure to a burnt orange colored syrup which was dried by distillation with about 100 milliliters of absolute ethanol. The dried residual syrup was taken up in 200 milliliters of hot absolute ethanol, and the resulting solution was seeded with the high-melting polymorph of (−)dulcitylpantamide and stored at three degrees centigrade for four hours. The resulting crystals were removed by filtration, washed with absolute ethanol, and dried in a vacuum oven at 50 degrees centigrade. There was obtained 34.1 grams (28.5 percent) of product (Crop B) melting at 112–115 degrees centigrade, and having a specific rotation at 25 degrees centigrade of +9 degrees (C 2%, water), indicating 95.2 percent of (+)dulcitylpantamide and 4.8 percent of (−)dulcitylpantamide.

The mother liquor was stored in a refrigerator overnight yielding a third crop of crystals. There was obtained 6.6 grams (5.5 percent) of a product (Crop C) melting at 120–135 degrees centigrade and having a specific rotation at 25 degrees centigrade of −7 degrees (C 1.9%, water), indicating 59 percent of (+)dulcitylpantamide and 41 percent of (−)dulcitylpantamide.

The mother liquor was concentrated under reduced pressure to a volume of about 125 milliliters. The concentrate was seeded with the high-melting polymorph of (−)dulcitylpantamide and stored at 3 degrees centigrade overnight. There was obtained a fourth crop (Crop D) of crystals weighing 5.9 grams (4.9 percent), melting at 148–153 degrees centigrade, and having a specific rotation at 25 degrees centigrade of −23 degrees (C 2%, water) indicating 77 percent of (−)dulcitylpantamide and 23 percent of (+)dulcitylpantamide.

The mother liquor was concentrated to 50 milliliters and stored at 3 degrees centigrade for three hours, whereupon it set up to a solid which was separated with difficulty by filtration. Since this material was sticky and amorphous, it was recrystallized from about 75 milliliters of absolute ethanol to yield a crystalline fifth crop. There was thus obtained 7.5 grams (6.2 percent) of product (Crop E) melting at 103–111 degrees centigrade, and having a specific rotation at 25 degrees centigrade of +9 degrees (C 1.89%, water), indicating 95.2 percent of (+)dulcitylpantamide and 4.8 percent of (−)dulcitylpantamide.

The residual liquor from which the five crops of dulcitylpantamide were removed was concentrated to a syrup which on trituration with ethanol yielded a sixth crop (Crop F) of crystals weighing 1.4 grams (1.2 percent), melting at 162.5–164 degrees centigrade and having a specific rotation at 25 degrees centigrade of −32 degrees in water, indicating 98 percent of (−)dulcitylpantamide and two percent of (+)dulcitylpantamide.

*Example 5.—Resolution of D,L-pantolactone*

A 15.6 gram sample of D,L-pantolactone and 18.1 grams of D(−)galactamine were fused with frequent swirling at 125 degrees centigrade for two hours. The brown syrupy reaction mixture was dissolved in fifty milliliters of water and the excess pantolactone was extracted with methylene chloride. The water was removed under reduced pressure and the residual syrup was taken up in a minimum amount of hot absolute ethanol. The hot solution was seeded with high melting (−)dulcitylpantamide and the resolution was thereupon completed in the same manner as described in Example 4.

TABLE 2.—THE RESOLUTION OF PANTOLACTONE WITH D(—)GALACTAMINE

[Theoretical amides=120 grams.]

| Crop | A | B | C | D | E | F |
|---|---|---|---|---|---|---|
| Recovered Wt. Percent of Dulcitylpantamide | 39 | 28.5 | 5.5 | 4.9 | 6.2 | 1.2 |
| Cum. Wt. Percent of Theory | 39 | 67.5 | 73.0 | 77.9 | 84.1 | 85.3 |
| M. P. (° C.) | 161–163 | 112–115 | 120–135 | 148–153 | 103–111 | 162–164 |
| $[\alpha]_D^{25}$ H$_2$O (°) | −30 | +9 | −7 | −23 | +9 | −32 |
| Percent of D(+) Component | 7 | 95.2 | 59 | 23 | 95.2 | 2 |
| Percent of L(−) Component | 93 | 4.8 | 41 | 77 | 4.8 | 98 |
| Recovered Wt. Percent of D(+) isomer | 5.5 | 54 | 6.5 | 2.3 | 11.0 | 0.5 |
| Cum. Wt. Percent of D(+) isomer | 5.5 | 59.5 | 66.0 | 68.3 | 79.3 | 79.8 |
| Recovered Wt. Percent of L(−) isomer | 72.5 | 2.7 | 4.5 | 7.5 | 0.6 | 2.4 |
| Cum. Wt. Percent of L(−) isomer | 72.5 | 75.2 | 79.7 | 87.2 | 87.8 | 90.2 |
| Yield of Lactone on Hydrolysis | | 93.7 | | | | |
| $[\alpha]_D^{25}$ of Lactone in H$_2$O | | −47.6 | | | | |
| Composition of Lactone | | 97.6 D | | | | |

*Example 6.—Hydrolysis of (+)dulcitylpantamide*

31 grams of (+)dulcitylpantamide was heated on a steam bath in 100 milliliters of seven percent hydrochloric acid for three hours. The solution was extracted continuously with benzene for 17.5 hours. The benzene solution was concentrated to dryness to yield 8.5 grams of white crystals. Ten percent hydrochloric acid (25 milliliters) was added to the aqueous phase and it was reheated on a steam bath for 1.5 hours. It was then extracted with five sixty-milliliter portions of methylene chloride which were combined and dried over anhydrous sodium sulfate. The dried methylene chloride extract was mixed with the white chystals obtained above and the methylene chloride evaporated under reduced pressure. The combined crystals now weighed 11.5 grams (88.5 percent yield). An aliquot of this material, after sublimation, had a specific rotation in water at 25 degrees centigrade of −47.6 degrees, indicating (−)pantolactone of 97.6 percent purity.

The aqueous phase from the above extraction was concentrated to dryness under reduced pressure and the residual solid was triturated with methylene chloride to remove residual pantolactone. Evaporation of the methylene chloride extracts produced 0.68 gram (5.2 percent) of (−)pantolactone. The total yield of recovered pantolactone was 93.7 percent.

The acid phase containing the galactamine hydrochloride was evacuated at twenty millimeters and fifty degrees centigrade to remove the last traces of hydrochloric acid. The galactamide hydrochloride thus obtained was dissolved in 500 milliliters of deionized water and the solution (0.2N) was passed through a bed of anion exchange resin in the hydroxide form. The rate of flow was adjusted to approximately five milliliters per minute (space velocity of about 0.04 milliliter per milliliter of resin per minute). The column was washed with water until the pH of the effluent was 7.5 The aqueous effluent was then concentrated to dryness under reduced pressure in a nitrogen atmosphere. The white crystalline residue, D(—)galactamine, was dried by repeated distillation of absolute ethanol (about 500 milliliters total) and finally by evacuation with an oil pump to yield 17.3 grams (95.5 percent) of D(—)galactamine, melting point 142 to 146 degrees centigrade.

*Example 7.—Preparation of pure (+)dulcitylpantamide*

In the same manner as disclosed in Example 1, an 89 percent yield of (+)dulcitylpantamide, melting point 112 to 116 degrees centigrade, and a specific rotation in water at 25 degrees centigrade of +9 degrees, was obtained by using the recovered D(—)galactamine from Example 6.

*Example 8.—Hydrolysis of high-melting (—)dulcitylpantamide*

6.6 grams of the high-melting polymorphic form of (—)dulcitylpantamide, melting point 160 to 162.5 degrees centigrade and specific rotation in water at 25 degrees centigrade of —30 degrees [93 percent (—)dulcitylpantamide], was heated on a steam bath in 25 milliliters of ten percent hydrochloric acid for three hours and the resulting solution was stored overnight at room temperature. The aqueous solution was extracted with four 25-milliliter portions of methylene chloride, the combined extracts were dried with anhydrous sodium sulfate, and the dried extract was concentrated to dryness leaving 2.26 grams of pantolactone (eighty percent yield). This material sublimed under high vacuum, had a melting point of 86.6–90 degrees centigrade and a specific rotation in water at 25 degrees centigrade of +43 degrees (93 percent optically pure (+)pantolactone).

*Example 9.—Hydrolysis of low-melting (—)dulcitylpantamide*

0.18 gram of the low-melting polymorph of (—)dulcitylpantamide, melting point 117 to 119 degrees centigrade and a specific rotation in water of —29 degrees, was heated on a steam bath with one milliliter of hydrochloric acid and four milliliters of water for two hours and the resulting solution was stored at about 25 degrees centigrade for eight hours. The solution was thereupon extracted with three twenty-milliliter portions of methylene chloride, the combined extracts were dried with anhydrous sodium sulfate, and the dried extract was concentrated to dryness leaving pantolactone which sublimed under high vacuum, had a melting point of about 85 degrees centigrade, and a specific rotation in water at 25 degrees centigrade of +39 degrees (89 percent optically pure (+)pantolactone).

The low melting polymorph of (—)dulcitylpantamide has been converted to the more desirable high-melting polymorph by boiling the low-melting polymorph with ethanol according to the following example:

*Example 10.—Preparation of high-melting (—)dulcitylpantamide*

A sample of (—)dulcitylpantamide having a melting point of 111 to 117 degrees centigrade and a specific rotation in water of —29 degrees centigrade was heated in refluxing ethanol for 6.5 hours. A crystalline solid readily separated from the hot solution. The crystalline material was removed by filtration and melted at 165.5 to 167 degrees centigrade which indicated that the product was the high-melting polymorph. The mother liquor was cooled to three degrees centigrade whereupon an additional quantity of the high-melting polymorph melting at about 158 degrees centigrade and having a specific rotation in water at 25 degrees centigrade of —30 degrees was obtained.

The occurrence of polymorphic forms of (—)dulcitylpantamide is definitely demonstrated, therefore, by the thermal convertability of the more unstable low-melting polymorph to the more stable high-melting form as shown in Example 10, as well as by the identity of the end products, viz., D(—)galactamine and pantolactone, produced by hydrolysis of either polymorph, as shown in Examples 8 and 9. Further proof of the presence of polymorphic forms was evidenced by a mixed melting point determination wherein the presence of the low-melting polymorph failed to depress the melting point of the more stable high-melting polymorph. This is consistent with polymorph theory. In addition potentiometric titration of the high-melting polymorph showed that the compound was essentially neutral, consuming neither hydrochloric acid nor sodium hydroxide. This was conclusive evidence that the new compound was not a salt, viz., dulcityl ammonium pantoate, as was first thought.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A process which comprises heating a mixture of D(—)α-hydroxy-β,β-dimethyl-γ-butyrolactone and L(+) α-hydroxy-β,β-dimethyl-γ-butyrolactone with D(—)galactamine to produce a mixture of (—)-N-D-dulcityl-L-(α,γ-dihydroxy-β,β-dimethylbutyramide) and (+)-N-D-dulcityl-D-(α,γ-dihydroxy-β,β-dimethylbutyramide).

2. A process which comprises heating a mixture of D(—)α-hydroxy-β,β-dimethyl-γ-butyrolactone and L(+)-α-hydroxy-β,β-dimethyl-γ-butyrolactone with (D(—)-galactamine to produce a mixture of (—)-N-D-dulcityl-L-(α,γ-dihydroxy-β,β-dimethylbutyramide) and (+)-N-D-dulcityl-D-(α,γ-dihydroxy-β,β-dimethylbutyramide), and separating the compounds by fractional crystallization.

3. A process which comprises heating a mixture of D(—)α-hydroxy-β,β-dimethyl-γ-butyrolactone and L(+)-α-hydroxy-β,β-dimethyl-γ-butyrolactone with D(—)galactamine to produce a mixture of (—)-N-D-dulcityl-L-(α,γ-dihydroxy-β,β-dimethylbutyramide) and (+)-N-D-dulcityl-D-(α,γ-dihydroxy-β,β-dimethylbutyramide), and isolating (+)-N-D-dulcityl-D-(α,γ-dihydroxy-β,β-dimethylbutyramide) from the reaction mixture.

4. A process for the resolution of a mixture of D(—)-α-hydroxy-β,β-dimethyl-γ-butyrolactone and L(+)α-hydroxy-β,β-dimethyl-γ-butyrolactone which comprises heating said mixture with D(—)galactamine, isolating (+)-N-D-dulcityl-D-(α,γ-dihydroxy-β,β-dimethylbutyramide) from the reaction mixture, and hydrolyzing (+)-N-D-dulcityl-D-(α,γ-dihydroxy-β,β-dimethylbutyramide) to produce D(—)α-hydroxy-β,β-dimethyl-γ-butyrolactone.

5. A process for the resolution of a mixture of D(—)-α-hydroxy-β,β-dimethyl-γ-butyrolactone and L(+)α-hydroxy-β,β-dimethyl-γ-butyrolactone which comprises heating said mixture with D(—)galactamine in the presence of an inert organic solvent to produce a mixture of (—)-N-D-dulcityl-L-(α,γ-dihydroxy-β,β-dimethylbutyramide) and (+)-N-D-dulcityl-D-(α,γ-dihydroxy-β,β-dimethylbutyramide), and separating the compounds by fractional crystallization.

6. A process for the resolution of a mixture of D(—)-α-hydroxy-β,β-dimethyl-γ-butyrolactone and L(+)α-hydroxy-β,β-dimethyl-γ-butyrolactone which comprises heating said mixture with D(—)galactamine in the presence of an inert organic solvent to produce a mixture of (—)-N-D-dulcityl-L-(α,γ-dihydroxy-β,β-dimethylbutyramide) and (+)-N-D-dulcityl-D-(α,γ-dihydroxy-β,β-dimethylbutyramide), recovering (+)-N-D-dulcityl-D-(α,γ-dihydroxy-β,β-dimethylbutyramide) from the reaction mixture, and hydrolyzing the recovered (+)-N-D-dulcityl-D-(α,γ-dihydroxy-β,β-dimethylbutyramide) to produce D-(—)α-hydroxy-β,β-dimethyl-γ-butyrolactone.

7. A process which comprises fusing a mixture of D(—)α-hydroxy-β,β-dimethyl-γ-butyrolactone and L-(+)α-hydroxy-β,β-dimethyl-γ-butyrolactone with D(—)-galactamine, and isolating (+)-N-D-dulcityl-D-(α,γ-dihydroxy-β,β-dimethylbutyramide) from the fused mixture.

8. A process for the resolution of a mixture of D(—)-α-hydroxy-β,β-dimethyl-γ-butyrolactone and L(+)α-hydroxy-β,β-dimethyl-γ-butyrolactone which comprises fusing said mixture with D(—)galactamine, isolating (+)-N-D-dulcityl-D-(α,γ-dihydroxy-β,β-dimethylbutyramide) from the fused mixture, and hydrolyzing the (+)-N-D-dulcityl-D-(α,γ-dihydroxy-β,β-dimethylbutyramide) to produce D(—)α-hydroxy-β,β-dimethyl-γ-butyrolactone.

9. A process for the resolution of a mixture of D(—)-α-hydroxy-β,β-dimethyl-γ-butyrolactone and L(+)α-hydroxy-β,β-dimethyl-γ-butyrolactone which comprises heating said mixture with D(—)galactamine to produce a mixture consisting of (+)-N-D-dulcityl-D-(α,γ-dihydroxy-β,β-dimethylbutyramide) and (—)-N-D-dulcityl-L-(α,γ-dihydroxy-β,β-dimethylbutyramide), isolating (—)-N-D-dulcityl-L-(α,γ-dihydroxy-β,β-dimethylbutyramide) from the reaction mixture, hydrolyzing the (—)-N-D-dulcityl-L-(α,γ-dihydroxy-β,β-dimethylbutyramide) to produce L(+)α-hydroxy-β,β-dimethyl-γ-butyrolactone, and racemizing the L(+)α-hydroxy-β,β-dimethyl-γ-butyrolactone to produce a mixture of L(+)α-hydroxy-β,β-dimethyl-γ-butyrolactone and D(—)α-hydroxy-β,β-dimethyl-γ-butyrolactone.

10. A process for the resolution of racemic α-hydroxy-β,β-dimethyl-γ-butyrolactone which comprises heating said racemic α-hydroxy-β,β-dimethyl-γ-butyrolactone with D(—)galactamine in the presence of an inert organic solvent, cooling the resulting reaction mixture to crystallize (—)-N-D-dulcityl-L-(α,γ-dihydroxy-β,β-dimethylbutyramide), concentrating the filtrate under reduced pressure, adding water to the resulting concentrate, extracting the aqueous mixture with an organic solvent, and recovering (+)-N-D-dulcityl-D-(α,γ-dihydroxy-β,β-dimethylbutyramide) from the aqueous phase by fractional crystallization.

11. A compound having the formula:

$$\begin{array}{c} CH_3 \quad\quad O \\ | \quad\quad\quad || \\ CH_3-C-CHOH-C-NH-CH_2 \\ | \quad | \\ OH \quad CH_3 \quad\quad H-C-OH \\ \quad\quad\quad\quad\quad HO-C-H \\ \quad\quad\quad\quad\quad HO-C-H \\ \quad\quad\quad\quad\quad H-C-OH \\ \quad\quad\quad\quad\quad CH_2OH \end{array}$$

12. A compound selected from the group consisting of (—)-N-D-dulcityl-L-(α,γ-dihydroxy-β,β-dimethylbutyramide) and (+)-N-D-dulcityl-D-(α,γ-dihydroxy-β,β-dimethylbutyramide).

13. (—)-N-D-dulcityl-L-(α,γ-dihydroxy-β,β-dimethylbutyramide) having a melting point of between about 122–123 degrees centigrade and a specific rotation in water of about —33 degrees.

14. (—)-N-D-dulcityl-L-(α,γ-dihydroxy-β,β-dimethylbutyramide) having a melting point of between about 162–165 degrees centigrade and a specific rotation in water of about —33 degrees.

15. (+)-N-D-dulcityl-D-(α,γ-dihydroxy-β,β-dimethylbutyramide) having a melting point of between about 117–118 degrees centigrade and a specific rotation in water of about +11 degrees.

References Cited in the file of this patent

UNITED STATES PATENTS

| | | |
|---|---|---|
| 2,328,000 | Finkelstein | Aug. 31, 1942 |
| 2,390,281 | Tishler et al. | Dec. 4, 1945 |
| 2,423,062 | Bergel et al. | June 24, 1947 |
| 2,460,240 | Pickel et al. | Jan. 25, 1949 |